US008166664B2

(12) United States Patent
Verdi et al.

(10) Patent No.: US 8,166,664 B2
(45) Date of Patent: May 1, 2012

(54) METHOD OF ALIGNING ARM REFERENCE SYSTEM OF A MULTIPLE-ARM MEASUREMENT MACHINE

(75) Inventors: Michele Verdi, Rivoli (IT); Emanuele Ricci, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 0 days.

(21) Appl. No.: 12/678,154

(22) PCT Filed: Sep. 14, 2007

(86) PCT No.: PCT/IT2007/000641
§ 371 (c)(1),
(2), (4) Date: Jul. 3, 2010

(87) PCT Pub. No.: WO2009/034593
PCT Pub. Date: Mar. 19, 2009

(65) Prior Publication Data
US 2010/0281705 A1    Nov. 11, 2010

(51) Int. Cl.
    *G01B 5/004*    (2006.01)
(52) U.S. Cl. ............................................. 33/503; 33/557
(58) Field of Classification Search .................. 33/503, 33/556, 557, 559, 560
    See application file for complete search history.

(56) References Cited

U.S. PATENT DOCUMENTS

| 4,326,338 A | * | 4/1982 | Plante | 33/560 |
| 5,014,440 A | * | 5/1991 | Lessi et al. | 33/557 |
| 5,193,286 A | * | 3/1993 | Collier | 33/503 |
| 5,528,505 A |   | 6/1996 | Granger et al. | |
| 7,010,390 B2 |  | 3/2006 | Graf et al. | |
| 2009/0037141 A1 | * | 2/2009 | Liu et al. | 33/556 |
| 2009/0271996 A1 | * | 11/2009 | Ferrari et al. | 33/503 |
| 2009/0326849 A1 | * | 12/2009 | MacManus | 33/503 |

FOREIGN PATENT DOCUMENTS

| EP | 1260789 A | 11/2002 |
| EP | 1607194 A | 12/2005 |

OTHER PUBLICATIONS

Bonitz R G et al: "Calibrating a Multi-Manipulator Robotic System", IEEE Robotics & Automation Magazine, IEEE Service Center, Piscataway, NJ, US, vol. 4, No. 1, Mar. 1, 1997, pp. 18-22, XP000688537, ISSN: 1070-9932; abstract, p. 18, paragraph 1-p. 21, paragraph 1; figures 1-3.
Jianbo SZ: "Base Calibration for Dual Robot System", Control Theory and Applications, vol. 15, No. 4, Aug. 1998, pp. 575-582, XP009100562, abstract, Sections 1, 2, 2.1, 2.3 and 2.4.
International Search Report and Written Opinion of the International Search Authority for International Application No. PCT/IT2007/000641, mailed on Jun. 3, 2008.

\* cited by examiner

*Primary Examiner* — G. Bradley Bennett
(74) *Attorney, Agent, or Firm* — FSP LLC

(57) ABSTRACT

A method of aligning arm reference systems of a multiple-arm measuring machine having at least two measuring units, each having a movable arm; the method including the steps of aligning the reference systems of the measuring units when setting up the machine, and periodically updating alignment of the reference systems by detecting, by means of one measuring unit, a reference member carried by another measuring unit and moved successively by the other measuring unit into a number of positions at an intersection of the measuring volumes of the two measuring units.

8 Claims, 4 Drawing Sheets

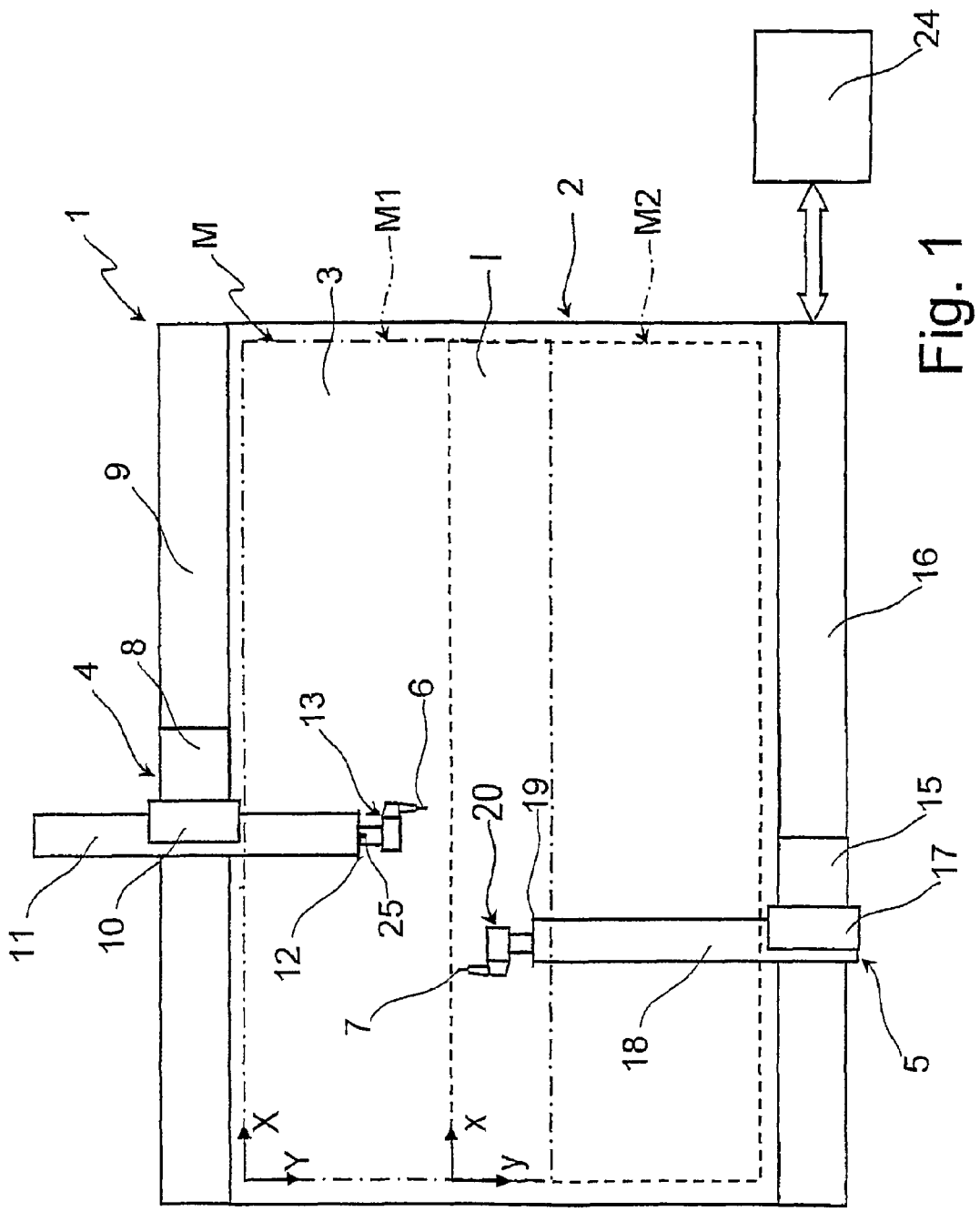

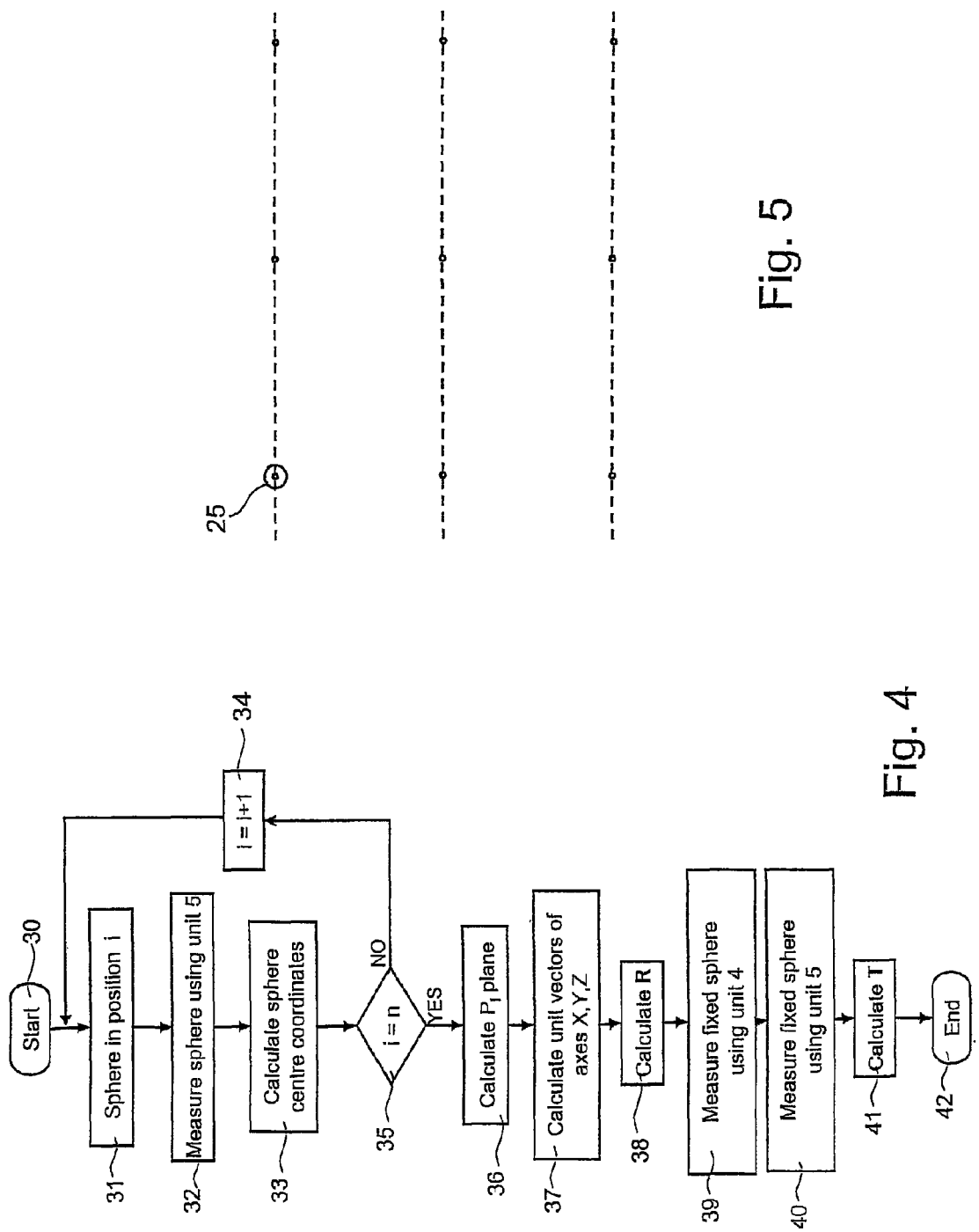

METHOD OF ALIGNING ARM REFERENCE SYSTEM OF A MULTIPLE-ARM MEASUREMENT MACHINE

PRIORITY

This application claims priority under 35 U.S.C. 365 AND/OR 35 U.S.C. 119 to PCT application no. PCT/IT2007/000641 filed on 14 Sep. 2007.

TECHNICAL FIELD

The present invention relates to a method of aligning arm reference systems of a multiple-arm measuring machine.

BACKGROUND ART

As is known, multiple-arm measuring machines comprise two or more measuring units, each with its own measuring tool, which operate in coordination under the control of a common control system. The measuring units are normally positioned with their respective measuring volumes side by side and overlapping at a small intersection, so the overall measuring volume of the machine is defined by the combined measuring volumes of the individual units. Multiple-arm measuring machines of the above type are therefore particularly suitable for measuring large-size parts, such as vehicle bodies or aircraft components.

In a typical embodiment, to which the following description refers for convenience and purely by way of example, the machine comprises two horizontal-arm cartesian measuring units located on opposite sides of the measuring volume, and each unit comprises a column movable along a longitudinal first axis with respect to the measuring volume, a carriage fitted to the column and movable along a vertical second axis, and an arm fitted to the carriage and movable with respect to it along a horizontal third axis perpendicular to the first axis and crosswise to the measuring volume.

In multiple-arm machines employing coordinate measuring units (particularly machines with two horizontal arms), aligning the cartesian reference system of one of the two arms (the secondary or "slave" arm) with respect to the other (the "primary" or "master" arm) is vital to measuring performance in two-arm mode.

The usual alignment method comprises measuring a sphere variously positioned at the intersection between the measuring volumes of the two units, and accordingly rotating and translating the cartesian reference system of the secondary arm with respect to that of the primary arm.

Measuring machine performance in multiple-arm mode depends closely on the compensation precision and dimensional stability of the individual units, and on the precision and stability of the results of the above alignment procedure.

The latter, in particular, is affected by deformation of both measuring units caused by variations in ambient temperature, which may result in distortion of the geometry of both units, not entirely recoverable by the geometric compensation procedure, and in elongation of the component parts of the units (transducers, beams, etc.), which often results in measuring errors serious enough to impair performance.

Distortion of individual units also results in even serious measuring errors in multiple-arm mode.

Frequently updating alignment of the cartesian reference systems of each unit of a multiple-arm machine is therefore of vital importance, but in actual fact difficult, if not impossible, to do in the case of on-line measuring systems, which rule out a fixed floor-mounted sphere for obvious accommodation reasons.

Another factor affecting the performance of multiple-arm machines is the weight of the workpiece, which may cause significant yield of the foundation and/or bed on which the units are installed, thus affecting the no-load-determined alignment conditions of the units.

One way of minimizing this effect is to align the systems with the workpiece set up in place, though often the very size of the workpiece prevents this. A "mockup" is another possible solution, but often unpractical and technically unfeasible, by involving additional movements, possibly interfering with dedicated workpiece supporting fixtures, and possibly differing considerably from the load configuration of the actual workpiece. The problem with this solution is further compounded by the load varying with different workpieces.

The only solution to these problems lies in oversizing the foundation and/or bed, thus increasing the cost of the machine.

DISCLOSURE OF INVENTION

It is an object of the present invention to provide a method of aligning arm reference systems of a multiple-arm measuring machine, designed to eliminate the aforementioned drawbacks typically associated with known methods.

According to the present invention, there is provided a method of aligning arm reference systems of a multiple-arm measuring machine, as claimed in claim 1.

The invention (which also applies to non-cartesian machines and to other than two-arm multiple-arm systems) provides for periodically updating the alignment matrix by means of one or more reference members located on the structure of at least one of the measuring units and measurable by the other unit.

The reference members may be:

a) one or more calibrated spheres located on the end of one of the arms and easily accessible by the tracer on the other arm, or located on a dedicated tool interchangeable with the measuring tools and housable in the tool-change store;

b) dedicated gauges, if the machine is equipped with non-contact tracers only, which cannot measure the above spheres easily.

By means of appropriate measuring programs activated automatically or by the operator alongside changes in the type of workpiece or in environmental conditions, such as variations in temperature, the invention provides for updating the alignment matrix, thus improving measuring performance and greatly reducing cost in terms of sizing of the foundation and/or bed.

Moreover, the method may be applied to the actual workpiece-occupied portion of the local volume common to both arms, thus potentially improving measuring performance and also enhancing the versatility of the system, which can thus be used for measuring both large- and small-size workpieces (vehicle bodies and panels).

BRIEF DESCRIPTION OF THE DRAWINGS

A preferred, non-limiting embodiment of the present invention will be described by way of example with reference to the accompanying drawings, in which:

FIG. 1 shows a schematic plan view of a two-arm measuring machine in accordance with the present invention;

FIG. 4 shows a flow chart of a procedure for aligning the reference systems of the FIG. 1 machine at the machine installation stage;

FIG. 5 shows the location of a reference member during the procedure shown in the FIG. 4 flow chart;

BEST MODE FOR CARRYING OUT THE INVENTION

Figure 2:
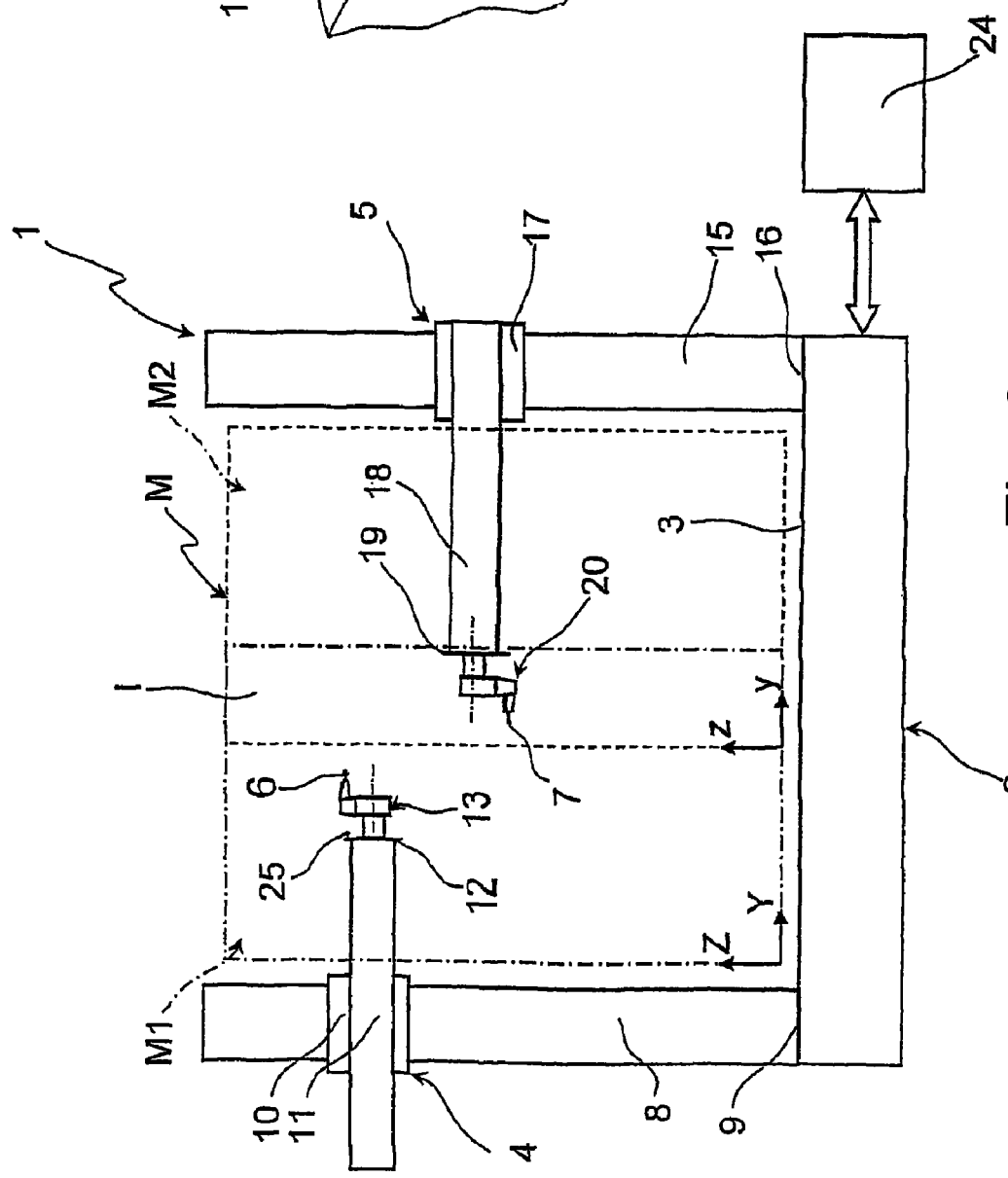
FIG. 2 shows a schematic front view of the FIG. 1 machine.

With reference to FIGS. 1 and 2, number 1 indicates as a whole a two-arm cartesian measuring machine.

Machine 1 substantially comprises a bed 2 defining a horizontal reference surface 3; and two horizontal-arm measuring units 4, 5 for moving respective measuring tools 6, 7 with respect to reference surface 3.

Measuring unit 4 comprises a column 8 movable along a guide 9 extending along a longitudinal side of bed 2 and parallel to an axis X of a set of three coordinate axes X, Y, Z defining a reference system integral with bed 2. Guide 9 may be of any conventional type, and is only shown schematically in FIG. 1.

Measuring unit 4 also comprises a carriage 10 fitted to and movable along column 8 along axis Z; and a horizontal arm 11 fitted to carriage 10 and movable along the horizontal axis Y.

Measuring tool 6 is fitted to an end flange 12 of arm 11, preferably by means of a known articulated head 13, with two degrees of rotational freedom, for adjusting the position of measuring tool 6.

Likewise, measuring unit 5 comprises a column 15 movable along a guide 16 extending along the opposite longitudinal side of bed 2 to guide 9 and parallel to axis X; a carriage 17 fitted to and movable along column 15 in a direction parallel to axis Z; and a horizontal arm 18 fitted to carriage 17 and movable in a direction parallel to axis Y.

Measuring tool 7 is fitted to an end flange 19 of arm 18, preferably by means of a known articulated head 20 with two degrees of rotational freedom.

The moving parts of measuring units 4, 5 and articulated heads 13, 20 are controlled by electric motors (not shown), in turn controlled by a control and processing unit 24 connected to known linear position transducers (not shown) associated with the machine axes, and to known angular transducers (not shown) associated with articulated heads 13, 20.

Figure 3:
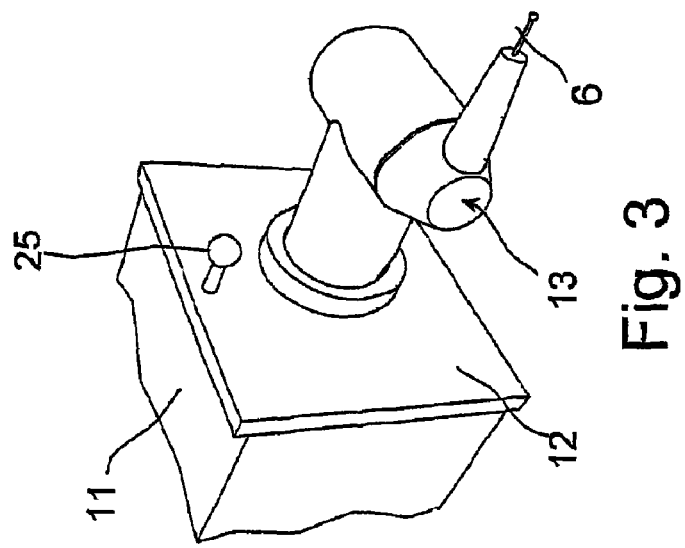
FIG. 3 shows a schematic detail of a measuring unit of the FIG. 1 machine.

As shown more clearly in FIG. 3, flange 12 of arm 11 of unit 4 is conveniently fitted with a reference sphere 25 for the purpose explained below.

Each measuring unit 4, 5 has its own measuring volume defined by all the positions reachable by the measuring tool alongside variations in the position of the machine axes. The two measuring volumes, indicated M1 and M2, necessarily have an intersection I, and together define the measuring volume M of machine 1 when operating in "two-arm" mode.

To operate in two-arm mode, the reference systems of both arms must be aligned, i.e. the measurements of both units 4, 5 must refer to a common reference system.

Assuming the X,Y,Z reference system defined above is that of unit 4 (the primary or "master" unit), a second x,y,z reference system may be introduced associated with unit 5 (the secondary or "slave" unit).

Aligning the two reference systems comprises rotating and translating the reference system of slave unit 5 so that its axes are parallel to and have the same origin as those of the reference system of master unit 4.

Mathematically, this amounts to applying a coordinate transformation τ:

$$P = \tau p = T + Rp \qquad (1)$$

where:

P is the three-component vector (X, Y, Z) of the master system coordinates;

p is the three-component vector (x, y, z) of the slave system coordinates;

T is a three-component translation vector (tx, ty, tz) which determines the position of the origin of the slave coordinate system in the master coordinate system; and R is a rotation matrix (3 by 3).

When setting up machine 1, routine geometric compensation of units 4 and 5 and qualification of measuring tools 6 and 7 are followed by alignment of the reference systems of units 4 and 5, which comprises the steps of:

1) Acquiring the angular errors between the two reference systems, and so determining the coefficients of matrix R.

A simple, easily automated method of determining rotation components only is as follows (FIG. 4).

The movable sphere 25, integral with arm 11, is moved successively by unit 4 along a grid defined by n positions in a plane parallel to axes X and Z (i.e. a Y-constant plane) at intersection I (FIG. 4), e.g. is moved into nine positions arranged in three horizontal rows (and so defining respective Z- and Y-constant lines r1, r2, r3—FIG. 5). The coordinates Pi of the centre of sphere 25 in the slave system are acquired in each of the above positions, and the operation is performed for all the positions in an automatic measuring cycle defined by blocks 31 to 35 in the FIG. 4 chart.

By means of an optimization, e.g. least squares, method, it is therefore possible to calculate the plane which best approximates the 9 points in the x,y,z slave reference system (block 36), and calculate the directions of axes X,Y,Z in the slave system (block 37).

More specifically, the unit vector of direction Y may be calculated as perpendicular to the calculated plane. The three rows of Z-constant points provide for determining the three lines best approximating them in the x,y,z system. The unit vector of direction X can be calculated from the direction cosines of the "mean" of said lines, the term "mean line" referring to the line defined by the mean of the angles formed by the three lines with each of the x,y,z system axes.

Finally, the unit vector of direction Z may be determined as the vector product of the unit vectors of directions X and Y.

By the end of the procedure, the direction cosines of axes X, Y, Z in the x,y,z system and hence the components of matrix R are therefore known (block 38).

2) Determining vector T by both units 4 and 5 measuring a fixed sphere located at a point in the measuring volume.

Given the coordinates in both coordinate systems of a specific point in the measuring volume, and given matrix R, the elements of vector T can be determined from (1), by measuring the fixed sphere by means of unit (block 39) and unit 5 (block 40), and calculating vector T (block 41) from the sphere centre coordinates acquired in both reference systems.

By the end of this procedure, which is performed as part of post-installation setup of the machine, alignment of the reference systems may be considered complete.

In actual fact, however, the components of matrix R and vector T may vary over time with respect to those originally determined at the machine setup stage.

The rotation components may be affected by variations in the geometry and the mutual position of the machine arms—normally due to temperature, or yield caused by the workpiece load.

Foremost of the thermal factors affecting performance of multiple-arm machines is what is known as thermal drift, which causes deformation of the transducers and structural parts of the machine, in turn resulting in a shift in the points within the measuring volume. The amount of shift depends not only on the amount of thermal stress applied, but also on the location of the point considered within the measuring volume. Such deformation produces variations in both matrix R and vector T.

As regards the workpiece load, this may produce significant variations in pitch and roll, possibly differing from arm to the other, depending on the more or less symmetrical position of the workpiece with respect to the arms.

To periodically update matrix R and vector T, a further calibration step is required, prior to release of the machine to the user, and which comprises determining the position of sphere 25 with respect to arm 11 (e.g. with respect to the flange centre). This is done by positioning sphere 25 at a point at intersection I of measuring volumes M1 and M2, where it can be detected by unit 5; and the coordinates reached by unit 4 are memorized.

Sphere 25 is then measured by measuring tool 7 of unit 5, and the coordinates of the centre of movable sphere 25 with respect to arm 11 of unit 4 are calculated and memorized, thus giving the position of the centre of sphere 25 on the basis of the machine coordinates of unit 4.

The above calibration step concludes setup of the machine. The reference system alignment updating procedures described below can be performed by the user, do not require skilled personnel as in the case of the above procedures, and, above all, do not involve prolonged, high-cost downtime of the machine.

Alignment may be updated either fully (vector T and matrix R) or partially, i.e. translational components only.

Full updating is recommended in the event of a significant change in the weight of the workpiece, or at the first shift of the week, or in the event of significant variations in ambient temperature, and is a probable once-weekly procedure.

Partial updating is recommended in the event of violent collision between the measuring tool and workpiece, whenever the measuring tool stylus is changed for one of the same type, or in the event of mild variations in ambient temperature, and is a probable once-daily procedure.

A) Updating Angular Alignment.

Figure 6:
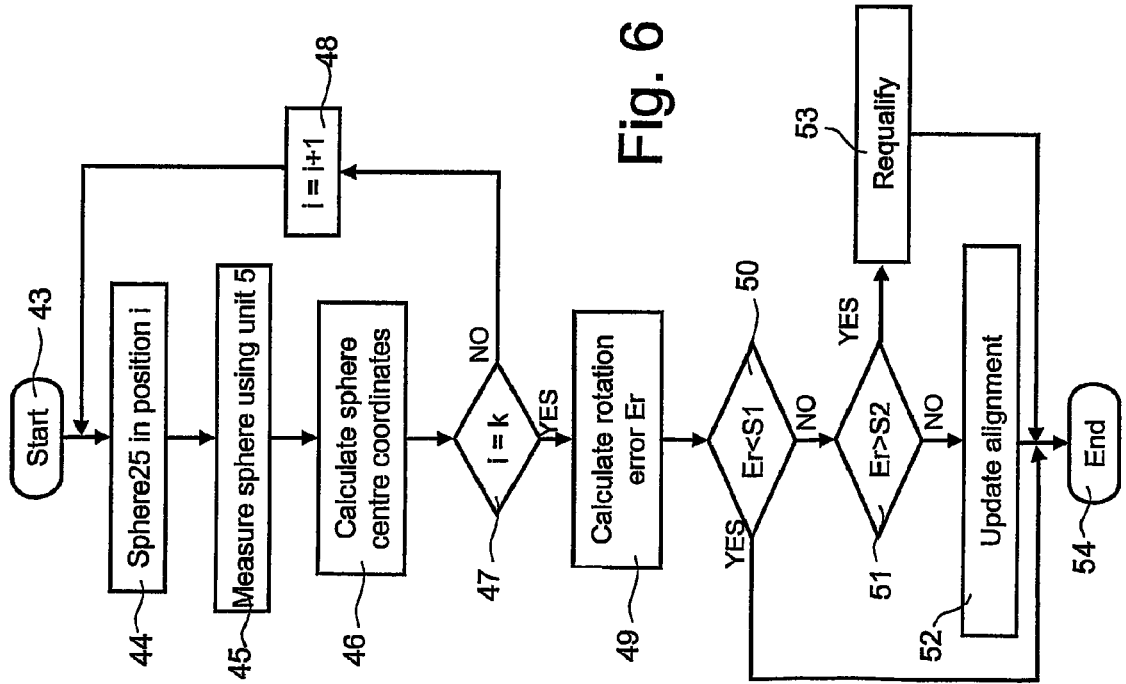
FIG. 6 shows a flow chart of a first operation in updating alignment of the reference systems of the FIG. 1 machine measuring units.

This procedure is described with reference to the FIG. 6 flow chart.

An automatic measuring cycle (blocks 43-47) is activated to measure movable sphere 25 on unit 4 in k number of discrete positions at intersection I by means of unit 5. The number of positions may be defined by the user, depending on the type of workpiece.

Block 49 calculates the angular alignment error Er in one or more predetermined directions. If angular alignment errors below a first threshold are detected, units 4 and 5 are considered still properly aligned, and the updating procedure is postponed (block 50).

If an angular alignment error is detected above a substantially higher second threshold (S2) (block 51), measuring tool 7 of unit 5 is assumed no longer qualified, so the updating procedure is interrupted to requalify measuring tool 7 (block 53).

Finally, if an angular alignment error between the first and second threshold is detected, alignment is updated (block 52) by a procedure similar to the initial alignment procedure (movable sphere 25 is moved by unit 4 along a grid of points in a Y-constant plane and is measured by unit 5; the unit vector defining direction Y is calculated as perpendicular to the plane approximating the acquired points; the unit vector of direction X is calculated from the lines interpolating successions of Z-constant points; and the unit vector of direction Z is calculated as the vector product of the unit vectors defining directions X and Y).

A residual rotation matrix R' is thus calculated, and which is used to correct the memorized rotation matrix R (the new rotation matrix equals the residual rotation matrix multiplied by the memorized rotation matrix).

B) Updating Translation Components.

Figure 7:
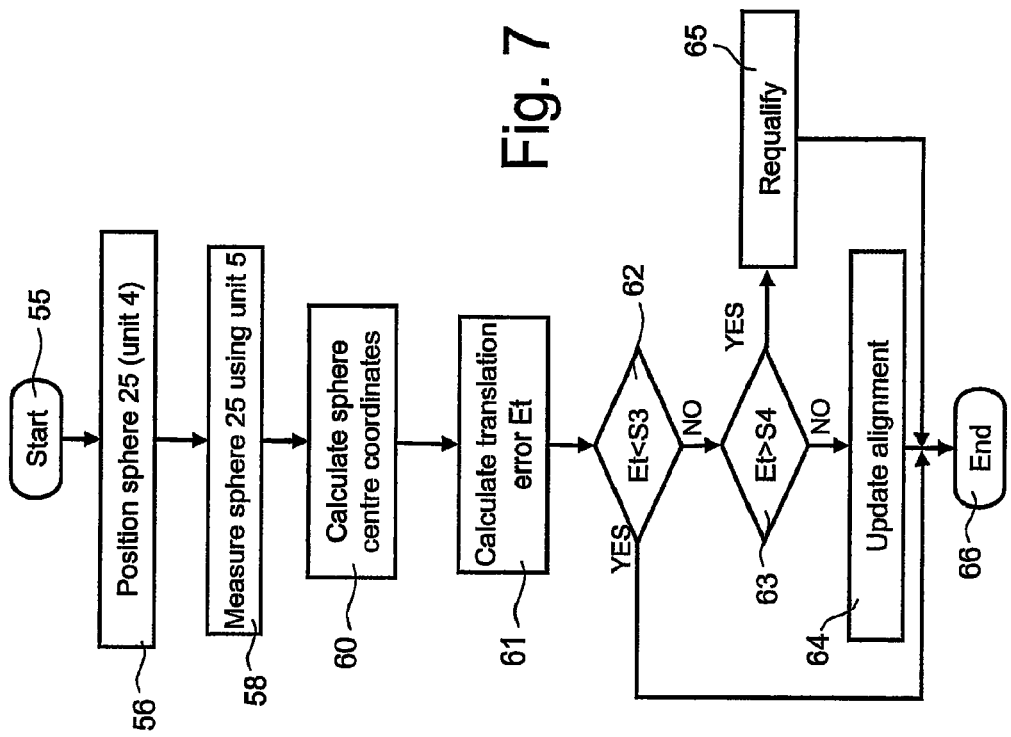
FIG. 7 shows a flow chart of a second operation in updating alignment of the reference systems of the FIG. 1 machine measuring units.

This procedure is described with reference to the FIG. 7 flow chart.

The movable sphere (25) is positioned by unit 4 in one position at intersection I (block 56) and measured by unit 5 (block 58); the sphere centre coordinates are calculated (block 60); and the translation error Et is calculated (block 61) as the difference between the sphere centre coordinates calculated on the basis of the unit 5 measurements, and the sphere centre coordinates calculated on the basis of the position coordinates of unit 4.

If a translation error is detected below (in absolute value or with reference to each individual component) a first threshold S3 (block 62), units 4 and 5 are considered still properly aligned, and the updating procedure is postponed.

If a translation error is detected above a substantially higher second threshold (S4) (block 63), measuring tool 7 of unit 5 is assumed no longer qualified, so the updating procedure is interrupted to requalify measuring tool 7 (block 65).

Finally, if a translation error between the first and second threshold is detected, a vector T' is calculated as the difference between the sphere centre coordinates measured by unit 5 and those resulting from the coordinates of unit 4, and is used to correct the memorized vector T (block 64). That is, the new (corrected) vector T equals the sum of vector T' and the memorized translation vector.

Both procedures A) and B) are performed for full updating, and only procedure B) for partial updating.

The advantages of the method according to the present invention will be clear from the foregoing description.

In particular, alignment of the reference systems of units 4 and 5 can be user-updated frequently, whenever called for by operating condition-affecting events (collision, variations in ambient temperature, changing from one workpiece to another, etc.).

The updating procedure itself is fast, and involves no floor-mounted artifacts.

The method ensures a high degree of measuring precision of the machine alongside variations in ambient conditions, with no need for skilled labour, and with no prolonged downtime of the machine.

Finally, because updating alignment of the reference systems provides for compensating errors caused by yield of the bed or foundation when the workpiece is loaded, the bed and/or foundation may be made lighter with no change in precision. In particular, the machine may be used above-ground, in which case, the foundation obviously cannot be overly rigid for reasons of structural resistance of the building.

Clearly, changes may be made to the present invention without, however, departing from the scope of the accompanying Claims.

In particular, the machine may comprise more than two units, and the units may be non-cartesian.

The updating procedure may be performed using different measuring tools, such as non-contact sensors. Finally, the initial alignment procedure may be performed in any other known manner, e.g. by setting the fixed sphere successively to various positions at intersection I of measuring volumes M1 and M2 of units 4 and 5, and determining the sphere centre coordinates in the various positions by means of both units 4 and 5. Mathematically, if $P_i$ and $p_i$ are the positions measured in the master and slave systems respectively, rotation matrix R is determined by minimizing the error function:

$$F=\Sigma_i(P_i-\tau(R,T)p_i) \quad (2)$$

which may be done, for example, using the least squares method. Obviously, the better the approximation, the greater the number of sphere positions i.

Alternatively, a complex artifact may be used, comprising, for example, a number of spheres in predetermined relative positions.

The invention claimed is:

1. A method of aligning arm reference systems of a multiple-arm measuring machine (1) comprising at least two measuring units (4, 5), each having a movable arm (11, 18), and a measuring tool (6, 7) movable by said arm (11, 18) in a respective measuring volume (M1, M2); the measuring volumes (M1, M2) of said measuring units (4, 5) having an intersection (I), and defining as a whole a machine measuring volume (M) equal to the combined measuring volumes (M1, M2) of the individual measuring units; and the method comprising the steps of:

fitting at least one reference member (25) to the arm (11) of at least a first measuring unit (4);

qualifying each of said measuring tools (6, 7) of the respective measuring units (4, 5);

aligning the reference systems (X,Y,Z; x,y,z) of said measuring units when setting up the machine (1); and periodically updating alignment of said reference systems by detecting said reference member (25) by means of at least another measuring unit (5); the reference member (25) being moved into a number of positions at said intersection (I) by the first measuring unit (4).

2. A method as claimed in claim 1, characterized in that said reference member (25) is fixed rigidly to said arm (11) of said first measuring unit (4).

3. A method as claimed in claim 2, characterized in that said reference member (25) is a sphere.

4. A method as claimed in claim 1, characterized by comprising the step of determining the position of said reference member (25) with respect to said arm (11) of said first measuring unit (4) by means of said other measuring unit (5).

5. A method as claimed in claim 1, characterized in that said step of updating alignment of the reference systems comprises updating a rotation matrix (R) and a translation vector (T).

6. A method as claimed in claim 1, characterized in that said step of updating alignment of the reference systems comprises only updating a translation vector (T).

7. A method as claimed in claim 1, characterized in that said updating step comprises performing an automatic measuring cycle, in which said reference member (25) is positioned at said intersection (I) by said first measuring unit (4) and measured by said other measuring unit (5).

8. A method as claimed in claim 1, characterized in that said updating step is started upon detection of a residual error ranging between a minimum threshold value (S1; S3) and a maximum threshold value (S2; S4).

* * * * *